United States Patent [19]

Bauch et al.

[11] Patent Number: 5,027,052
[45] Date of Patent: Jun. 25, 1991

[54] CIRCUIT ARRANGEMENT FOR GENERATING A PULSATORY SUPPLY VOLTAGE FOR A LOAD FROM A DIRECT VOLTAGE

[75] Inventors: Wolf-Dieter Bauch, Niederzier; Heinz Helmus, Aachen; Heinz B. Merker, Julich, all of Fed. Rep. of Germany

[73] Assignee: U.S. Philips Corporation, New York, N.Y.

[21] Appl. No.: 321,611

[22] Filed: Mar. 10, 1989

[30] Foreign Application Priority Data

Mar. 22, 1988 [DE] Fed. Rep. of Germany ....... 3809481

[51] Int. Cl.$^5$ .............................................. G05F 1/56
[52] U.S. Cl. .................................... 323/284; 323/285; 315/199
[58] Field of Search ................ 323/282, 284, 285, 351; 315/199; 307/270; 362/167

[56] References Cited

U.S. PATENT DOCUMENTS

| | | | |
|---|---|---|---|
| 3,317,820 | 5/1967 | Nylander | 323/284 |
| 3,707,635 | 12/1972 | Kawashima | 307/290 X |
| 4,048,665 | 9/1977 | Lia et al. | 323/284 X |
| 4,155,032 | 5/1979 | Schlick et al. | 315/199 X |
| 4,237,405 | 12/1980 | Kellis | 323/288 X |
| 4,360,783 | 11/1982 | Nagasawa et al. | 315/199 X |
| 4,598,244 | 7/1986 | Majima et al. | 323/282 X |
| 4,609,976 | 9/1986 | Geissler | 362/167 X |
| 4,774,450 | 9/1988 | Kitamura | 323/284 X |
| 4,849,683 | 7/1989 | Flolid | 323/284 |

FOREIGN PATENT DOCUMENTS 3308959 9/1984 Fed. Rep. of Germany .

Primary Examiner—Steven L. Stephan
Assistant Examiner—Kristine Peckman
Attorney, Agent, or Firm—Bernard Franzblau

[57] ABSTRACT

A circuit arrangement for generating a pulsatory supply voltage for a load (1), such as a halogen incandescent lamp, from a source of direct voltage, in which a predetermined effective value of the supply voltage remains substantially constant in the case of a varying direct voltage. A switch (2) supplies the supply voltage from which a low-pass filter generates a mean value voltage. The mean value voltage is applied to a Schmitt trigger circuit (3) which controls the switch whose first switching threshold is constant and is derived from a reference voltage which is present at a first input of the Schmitt trigger circuit. A second switching threshold of the switch varies oppositely with respect to a decreasing direct voltage.

11 Claims, 1 Drawing Sheet

CIRCUIT ARRANGEMENT FOR GENERATING A PULSATORY SUPPLY VOLTAGE FOR A LOAD FROM A DIRECT VOLTAGE

BACKGROUND OF THE INVENTION

This invention relates to a circuit arrangement for generating a pulsatory supply voltage for a load from a direct voltage, in which the predetermined effective value of the supply voltage remains substantially constant in the case of a varying direct voltage, said circuit arrangement comprising a switch supplying the supply voltage, a low-pass filter coupled to the load and generating a mean value voltage, and a Schmitt trigger circuit maintaining the mean value voltage and closing the switch when the mean value voltage reaches a first switching threshold and opening the switch when the men value voltage reaches a second switching threshold.

Such a circuit arrangement is known from DE-OS 33 08 959 which is used for generating, from a fluctuating direct voltage, a pulsatory supply voltage whose effective value is substantially constant. The output of an ohmic load or the light output of an incandescent lamp is directly proportional to the effective value of the supply voltage which is present. In the known circuit arrangement an incandescent lamp is fed via a switch from an accumulator or a battery whose direct voltage decreases during operation. The supply voltage is squared in a squaring member and the squared supply voltage is compared with a nominal voltage in a summing device. The output voltage of the summing device is applied via a low-pass filter, which generates a mean value voltage, to a Schmitt trigger circuit which controls the switch arranged between the direct voltage source and the incandescent lamp. The nominal voltage corresponds to the squared predetermined effective value. The switching thresholds of the Schmitt trigger circuit are adjusted in such a way that the ratio between pulse duration and pulse interval (pulse duty factor) corresponds to the mean value of the output voltage of the summing device. The squaring member, which is required in the circuit, generally has many components, is complicated and is not stable as regards temperature without an additional temperature compensation circuit.

SUMMARY OF THE INVENTION

It is therefore an object of the invention to provide a simple circuit arrangement for generating a pulsatory supply voltage for a load from a direct voltage.

In a circuit arrangement of the type described in the opening paragraph, this object is achieved in that the low-pass filter directly generates the mean value voltage from the supply voltage and in that the first switching threshold derived from a reference voltage which is present at the first input of the Schmitt trigger circuit is constant and the second switching threshold varies oppositely with respect to the decreasing direct voltage.

In this circuit arrangement the switching thresholds of the Schmitt trigger circuit are not adjusted in such a way that the pulse duty factor is equal to the mean value of the voltage which is present at the low-pass filter, but they are adjusted in such a way that the pulse duty factor is equal to the effective value of the voltage which is present at the low-pass filter. To this end it is necessary that the low-pass filter directly receives the supply voltage, that is to say that it is connected to the load. This measure precludes the use of a squaring member as required in the known circuit arrangement.

The switching thresholds may be determined by means of practical tests or by means of a calculation. The pulse duty factor must be determined for a desired effective value. The switching thresholds to be found result from a combination of the pulse duty factor with the low-pass filter function.

The direct voltage is generated by a battery, which voltage decreases with longer periods of operation. To obtain the required effective value, the first switching threshold, which is dependent on the reference value, remains constant and the second switching threshold varies oppositely with respect to the decreasing supply voltage.

In a preferred embodiment of the invention the Schmitt trigger circuit comprises an amplifier to whose inverting input a reference voltage source supplying the reference voltage is connected, to whose non-inverting input an input resistor maintaining the mean value voltage is connected and to whose output a positive feedback resistor is connected. The amplifier is non-inverting in this case. It is alternatively possible to use an inverting amplifier whose inverting input is coupled to the mean value voltage and whose non-inverting input is coupled to the output via a voltage divider to which a reference voltage source is connected. To save components, the low-pass filter is combined with the Schmitt trigger circuit in such a way that the positive feedback resistor and the input resistor also determine the time constant of the low-pass filter.

To reduce the voltage at the inverting input of the Schmitt trigger circuit, a grounded divider resistor is coupled to the non-inverting input of the amplifier.

The switch preferably comprises at least a transistor whose base is coupled to the output of the Schmitt trigger circuit and whose emitter-collector path is arranged between the direct voltage terminal and the load.

The space-saving construction of the circuit arrangement makes it suitable for use in a torch, in which the load is a halogen incandescent lamp.

BRIEF DESCRIPTION OF THE DRAWINGS

An embodiment of the invention will now be described in greater detail with reference to the accompanying drawings, in which.

DESCRIPTION OF THE PREFERRED EMBODIMENTS

Figure 1:
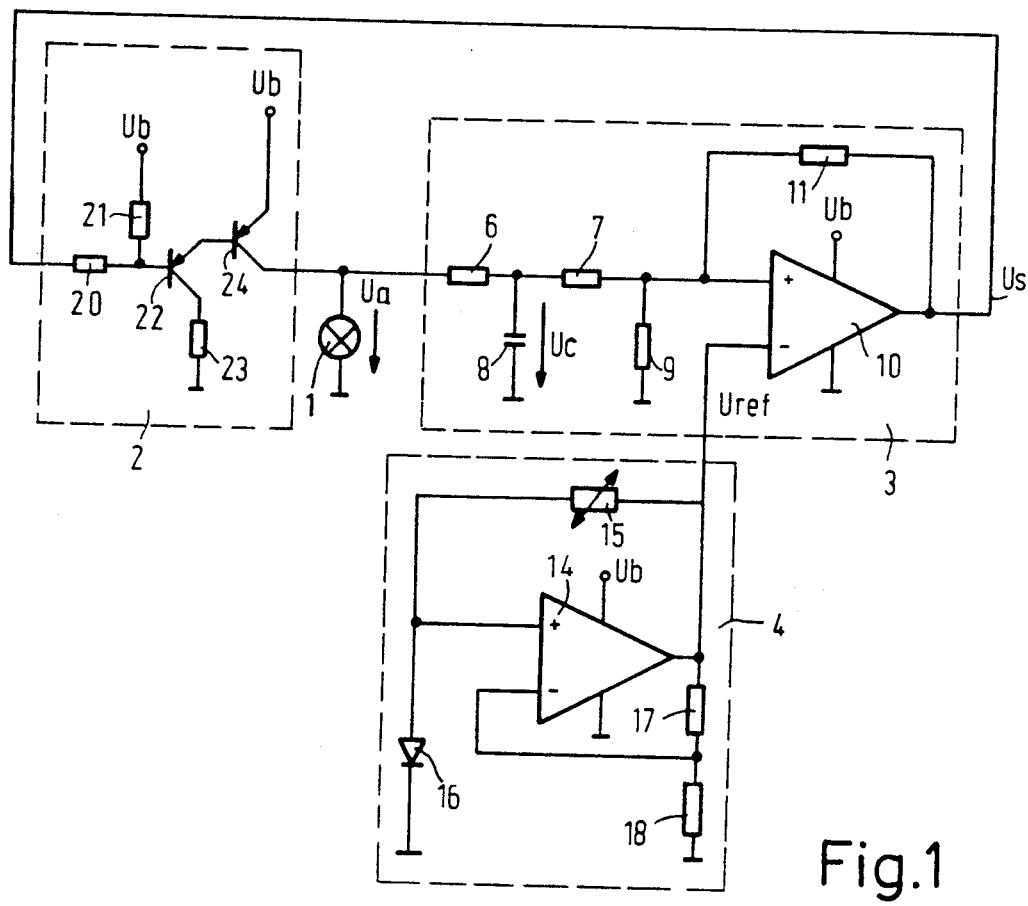
FIG. 1 shows a circuit arrangement for generating a pulsatory supply voltage for a halogen lamp from a battery voltage.

The circuit arrangement shown in FIG. 1 is used for supplying a halogen incandescent lamp 1 which is used, for example, in a torch. The supply voltage Ua which is present at the halogen incandescent lamp 1 consists of pulses which are supplied by a switch 2. In the closed state the switch 2 connects the incandescent lamp 1 to the positive terminal of a battery (not shown) and in the open state it interrupts this connection. The switch 2 is controlled by a Schmitt trigger circuit 3 comprising a low-pass filter which receives a reference voltage Uref from a reference voltage source 4. The light output of the lamp 1 is proportional to the effective value of the lamp supply voltage Ua. The Schmitt trigger 3 controls the switch 2 in such a way that the pulse duty factor corresponds to the predetermined effective value.

The ungrounded terminal of the incandescent lamp 1 is connected to a resistor 6 whose other terminal is connected to a further resistor 7 (input resistor) and to a capacitor 8 which is connected to ground. The other terminal of the resistor 7 is connected to a resistor 9 (divider resistor) which is connected to ground and to the non-inverting input of an amplifier 10. A resistor 11 (positive feedback resistor) is arranged between the non-inverting input of the amplifier 10 and its output. The inverting input of the amplifier 10 receives a reference voltage Uref from the reference voltage source 4.

The actual Schmitt trigger circuit is constituted by the resistors 7, 9 and 11 and the amplifier 10. The mean value voltage Uc at capacitor 8, applied to the Schmitt trigger circuit, is generated by a low-pass filter which essentially comprises the resistor 6 and the capacitor 8. However, when calculating the time constant, the resistors 7 and 9 must be taken into account because the low-pass filter and the Schmitt trigger circuit are not decoupled.

The reference voltage source 4 comprises an amplifier 14 whose non-inverting input is connected to a terminal of an NTC resistor 15 and to the anode of a diode 16. The cathode of the diode 16 is connected to ground. The inverting input of the amplifier 14 is connected to the output of the amplifier 14 via a resistor 17 and via resistor 17 to the other terminal of the NTC resistor 15, and it is further connected to a grounded resistor 18. The common terminal of the resistor 17, the output of the amplifier 14 and the NTC resistor 15 is connected to the inverting input of the amplifier 10 of the Schmitt trigger circuit 3. The NTC resistor 15 serves for temperature stabilisation.

The voltage Us generated at the output of the Schmitt trigger circuit 3 is applied to a resistor 20 which forms a part of the switch 2. The other terminal of the resistor 20 is connected to the positive terminal of the battery via a further resistor 21 and to the base of a pnp transistor 22. The collector of the transistor 22 is connected to a grounded resistor 23. The emitter of the transistor 22 is coupled to the base of a further pnp transistor 24 whose collector is connected to the resistor 6 and the halogen incandescent lamp 1. The battery voltage Ub is applied to the emitter of the transistor 24. The pulses generated by the switch 2 have a voltage value which is equal to the battery voltage Ub minus the saturation voltage of the transistor 24. The resistors 20 and 21 are used for driving the transistor 22.

The function of the circuit arrangement according to FIG. 1 will now be explained with reference to the voltage waveforms shown in FIG. 2. The Schmitt trigger circuit 3 generates pulses (Us) which are applied to the switch 2. If the voltage Us at the output of the circuit 3 changes from a high to a low voltage state, the transistor 22 is turned on and the base of transistor 24 is given a low voltage state. Consequently the transistor 24 is turned on. If the base of the transistor 22, i.e. the input of the switch 2 has a high voltage state, the two transistors 22 and 24 are turned off. The halogen incandescent lamp 1 would be voltageless in this case. Thus, the switch 2 inverts the voltage supply to it so that the switch 2 generates a pulse interval when the Schmitt trigger circuit 3 generates a pulse.

Figure 2A:
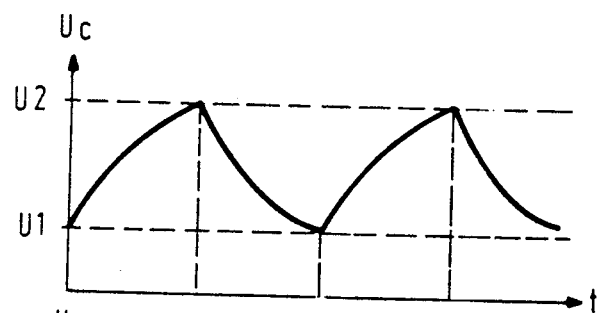
FIGS. 2a and 2b show some voltages which occur in the circuit arrangement according to FIG. 1.
Figure 2B:
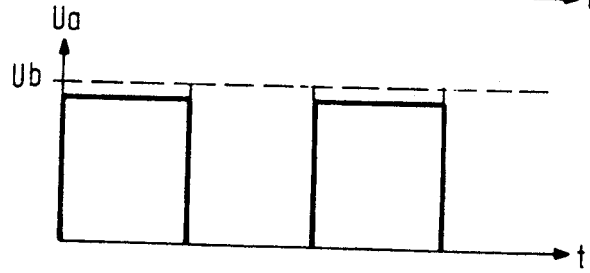

If a pulse is present (FIG. 2b) at the output of the switch 2, the low-pass filter in the circuit 3 generates an exponentially increasing mean value voltage Uc (FIG. 2a). If there is a pulse interval, the mean value voltage Uc decreases exponentially. If the mean value voltage Uc increases and if the first switching threshold U2 of the Schmitt trigger circuit 3 is reached, the voltage state at the output of this circuit is changed over and the transistor 24 is turned off so that a pulse interval is present. From this instant the low-pass filter supplies an exponentially decreasing mean value voltage Uc. If the mean value voltage Uc reaches the second switching threshold U1, the output voltage of the circuit 3 is changed over and the switch 2 starts supplying a new pulse to the incandescent lamp 1. FIG. 2b shows the battery voltage Ub in a broken line above the pulses.

The switching thresholds of the Schmitt trigger circuit 3 are determined by the reference voltage Uref, the resistors 7, 9 and 11 and the battery voltage Ub. For the first switching threshold U2 it holds that:

$$U2 = (1 + R1/R2 + R1/R3)\ Uref$$

and for the second switching threshold it holds that $$U1 = U2 - R1/R3\ Ub$$

in which R1 is the resistance of resistor 7, R2 is the resistance of the resistor 9 and R3 is the resistance of resistor 11.

The resistors 7 and 11 can be determined by practical tests or by calculation in such a way that the pulse duty factor corresponds to the predetermined effective value. If the battery voltage Ub decreases, the second switching threshold U1 increases. Consequently, the effective value essentially remains at its predetermined value, even when the battery voltage Ub decreases. Due to this increase of the second switching threshold U1 the clock frequency, is increased as is the duty cycle so that the desired effective value is maintained.

The switch 2 can be dimensioned in such a way that the transistor 24 is through-connected in the case of a battery voltage below a voltage which is approximately equal to the effective value, so that the lamp 1 is then supplied with a direct voltage which is equal to the battery voltage minus the saturation voltage of the transistor 24.

The following components were used in a practical embodiment for supplying a 4 V/0.5 A halogen incandescent lamp from a 6 V battery:
 amplifiers 10 and 14: LM 358
 transistor 24: BD 558
 transistor 22: BD 436
 capacitor 8: 0.047 μF
 resistors 6, 7 and 18: 47 kOhm
 resistor 9: 68 kOhm
 resistor 11: 150 kOhm
 resistor 17: 60 kOhm
 resistor 20: 2.2 kOhm
 resistor 21: 15 kOhm
 NTC resistor 15: NTC 470 R
 diode 16: 1 N 4148.

We claim:
1. A circuit arrangement for generating a pulsatory supply voltage for a load from a direct voltage source, said circuit arrangement comprising: a switch for coupling the direct voltage source to the load, a low-pass filter coupled to the load for directly generating for a Schmitt trigger circuit a mean value voltage from the load pulsatory supply voltage, wherein the Schmitt trigger circuit maintains the mean value voltage by opening the switch when the mean value voltage reaches a first switching threshold (U2) and closing the switch when the mean value voltage reaches a second switching threshold (U1), wherein the first switching threshold (U2) is derived from a reference voltage which is present at a first input of the Schmitt trigger circuit and is constant, and the second switching threshold (U1) varies oppositely with respect to a decreasing direct voltage, whereby a predetermined effective value of the supply voltage remains substantially constant despite a variation in said direct voltage.

2. A circuit arrangement as claimed in claim 1, wherein the Schmitt trigger circuit comprises an amplifier having an inverting input connected to a reference voltage source supplying the reference voltage, a non-inverting input of the Schmitt trigger circuit being connected to an input resistor and an output thereof being connected to a positive feedback resistor.

3. A circuit arrangement as claimed in claim 2 wherein the switch comprises at least a transistor whose base is coupled to the output of the Schmitt trigger circuit and whose emitter-collector path is coupled between a direct voltage terminal (Ub) and the load.

4. A circuit arrangement as claimed in claim 2 further comprising a grounded divider resistor coupled to the non-inverting input of the amplifier, and wherein the opposite variation of the second switching threshold with respect to the decreasing direct voltage causes the frequency of the pulsatory supply voltage to increase.

5. A circuit arrangement as claimed in claim 1 wherein the switch comprises at least a transistor whose base is coupled to an output of the Schmitt trigger circuit and whose emitter-collector path is coupled between a direct voltage terminal (Ub) and the load.

6. A torch comprising:
   a halogen incandescent lamp load,
   a transistor switch connected in series circuit with the lamp load across terminals of a DC battery to produce a pulsatory load voltage,
   a Schmitt trigger circuit having a first input coupled to a source of reference voltage,
   a low-pass filter coupled to the lamp load and to a second input of the Schmitt trigger circuit to supply to said second input a mean value voltage produced directly by the low-pass filter from the pulsatory load voltage,
   means connecting an output of the Schmitt trigger circuit to a control input of the transistor switch, wherein
   said Schmitt trigger circuit switches between a first constant voltage threshold level and a second voltage threshold level that varies inversely with respect to the battery voltage whereby a given effective value of the load voltage remains substantially constant despite a decrease in said battery voltage.

7. A circuit for supplying a pulsatory supply voltage to a load from a source of direct voltage, said circuit comprising:
   a transistor switch for coupling the direct voltage source to the load so as to produce the pulsatory supply voltage at the load,
   a trigger circuit having a first input coupled to a source of reference voltage,
   a low-pass filter coupled between the load and a second input of the trigger circuit to supply to said second input a control voltage derived by the low-pass filter from the load pulsatory supply voltage,
   means coupling an output of the trigger circuit to a control input of the transistor switch thereby to trigger the transistor switch off at a first threshold voltage and on at a second threshold voltage of said control voltage, wherein said first threshold voltage is constant and said second threshold voltage varies inversely with the direct voltage whereby the effective value of load voltage remains substantially constant despite a variation in the direct voltage.

8. A circuit as claimed in claim 7 wherein said low-pass filter comprises an RC circuit having its input connected to the load and its output connected to the second input of the trigger circuit.

9. A circuit as claimed in claim 8 wherein the trigger circuit comprises a Schmitt trigger including an amplifier having an inverting input and a non-inverting input that comprise said first and second trigger circuit inputs, respectively.

10. A circuit as claimed in claim 9 wherein the amplifier includes a feedback resistor coupled between its output and its non-inverting input whereby said feedback resistor is a part of the low-pass filter.

11. A circuit as claimed in claim 7 wherein the first input of the trigger circuit is substantially independent of the direct voltage and the transistor switch separates the second input of the trigger circuit from the source of direct voltage.

* * * * *